US010287080B2

(12) United States Patent
Stewart

(10) Patent No.: US 10,287,080 B2
(45) Date of Patent: May 14, 2019

(54) WRAPPING TEARING DEVICE

(71) Applicant: Scissio, LLC, San Diego, CA (US)

(72) Inventor: Brett Stewart, San Diego, CA (US)

(73) Assignee: Scissio, LLC, San Diego, CA (US)

( * ) Notice: Subject to any disclaimer, the term of this patent is extended or adjusted under 35 U.S.C. 154(b) by 81 days.

(21) Appl. No.: 15/696,149

(22) Filed: Sep. 5, 2017

(65) Prior Publication Data

US 2018/0065790 A1 Mar. 8, 2018

Related U.S. Application Data

(60) Provisional application No. 62/383,591, filed on Sep. 5, 2016.

(51) Int. Cl.
| | | |
|---|---|---|
| *B32B 3/14* | (2006.01) | |
| *B65D 75/66* | (2006.01) | |
| *B32B 7/06* | (2019.01) | |
| *B32B 7/12* | (2006.01) | |

(52) U.S. Cl.
CPC .............. *B65D 75/66* (2013.01); *B32B 7/06* (2013.01); *B32B 7/12* (2013.01); *Y10T 428/15* (2015.01)

(58) Field of Classification Search
CPC ...... Y10T 428/15; B65D 75/66; B65D 75/68; B65D 75/5805
See application file for complete search history.

(56) References Cited

U.S. PATENT DOCUMENTS

| | | |
|---|---|---|
| 5,558,223 A | 9/1996 | Stefanescu |
| 2005/0220377 A1* | 10/2005 | Hanus ............... B65D 75/66 383/206 |

FOREIGN PATENT DOCUMENTS

| | | |
|---|---|---|
| DE | 4403416 A1 | 8/1995 |
| GB | 2526396 A | 11/2015 |
| WO | 2006001889 A1 | 1/2006 |

OTHER PUBLICATIONS

PCT/US2017/050146. Int'l Search Report & Written Opinion (dated Jan. 18, 2018).

* cited by examiner

*Primary Examiner* — Alexander S Thomas
(74) *Attorney, Agent, or Firm* — Loza & Loza, LLP; Heidi L. Eisenhut

(57) ABSTRACT

A device for easily unwrapping a package forming a personalized pattern in the paper is provided. The device includes a first adhesive elongated strip layer, comprising: a first and second horizontal elongated edges having first and second ends; and first and second vertical side edges extending between the first and second horizontal elongated edges. Further included is a second adhesive elongated strip layer separated from the first adhesive layer by a gap, the second adhesive layer elongated strip, comprising first and second horizontal elongated edges each having first and second ends and first and second vertical side edges extending between the horizontal elongated edges. A first non-adhesive strip layer placed over the gap, a tearing thread located on the first non-adhesive strip layer; and a second non-adhesive strip layer located on top of the tearing thread and the first non-adhesive strip layer.

20 Claims, 5 Drawing Sheets

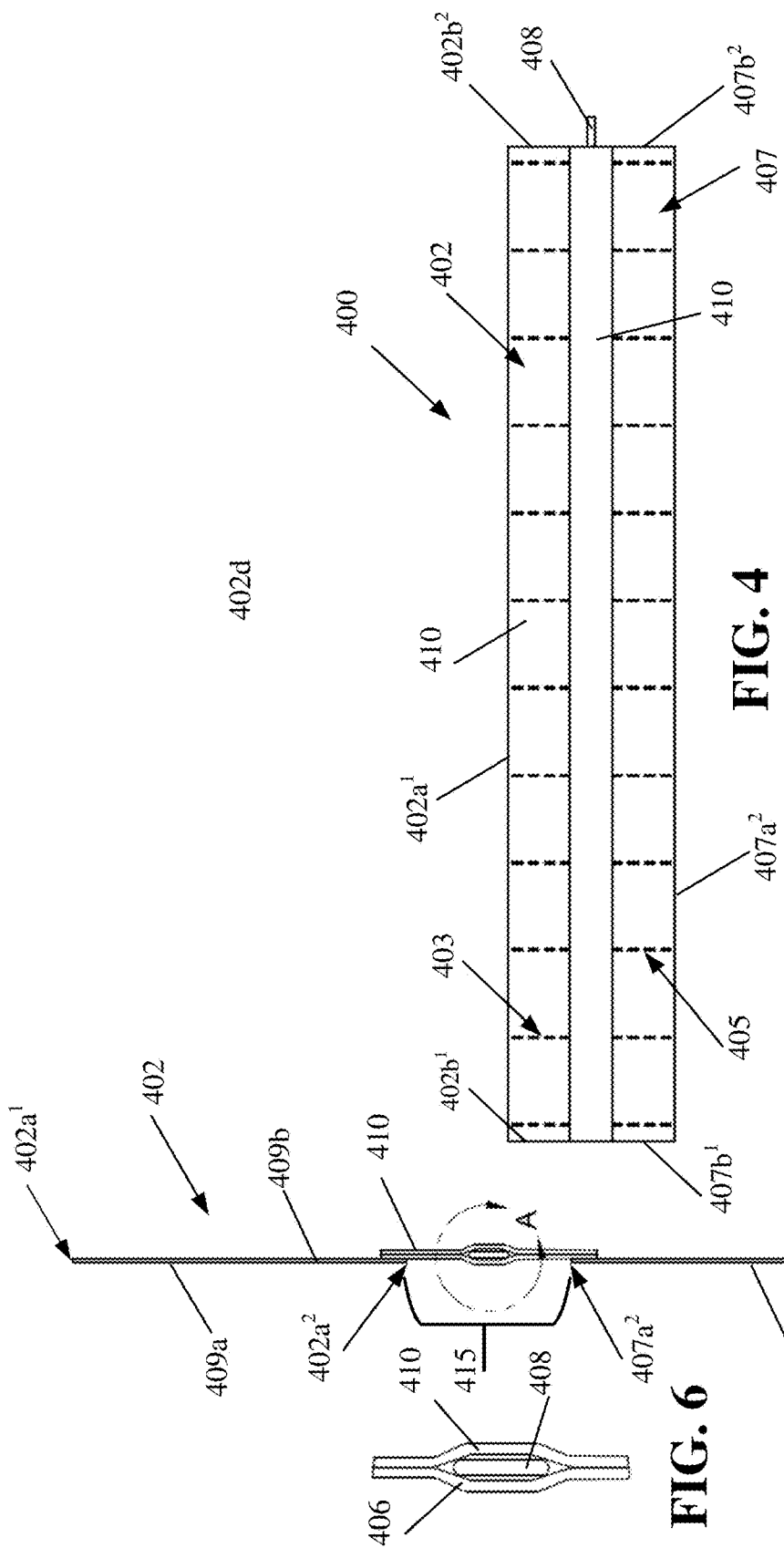

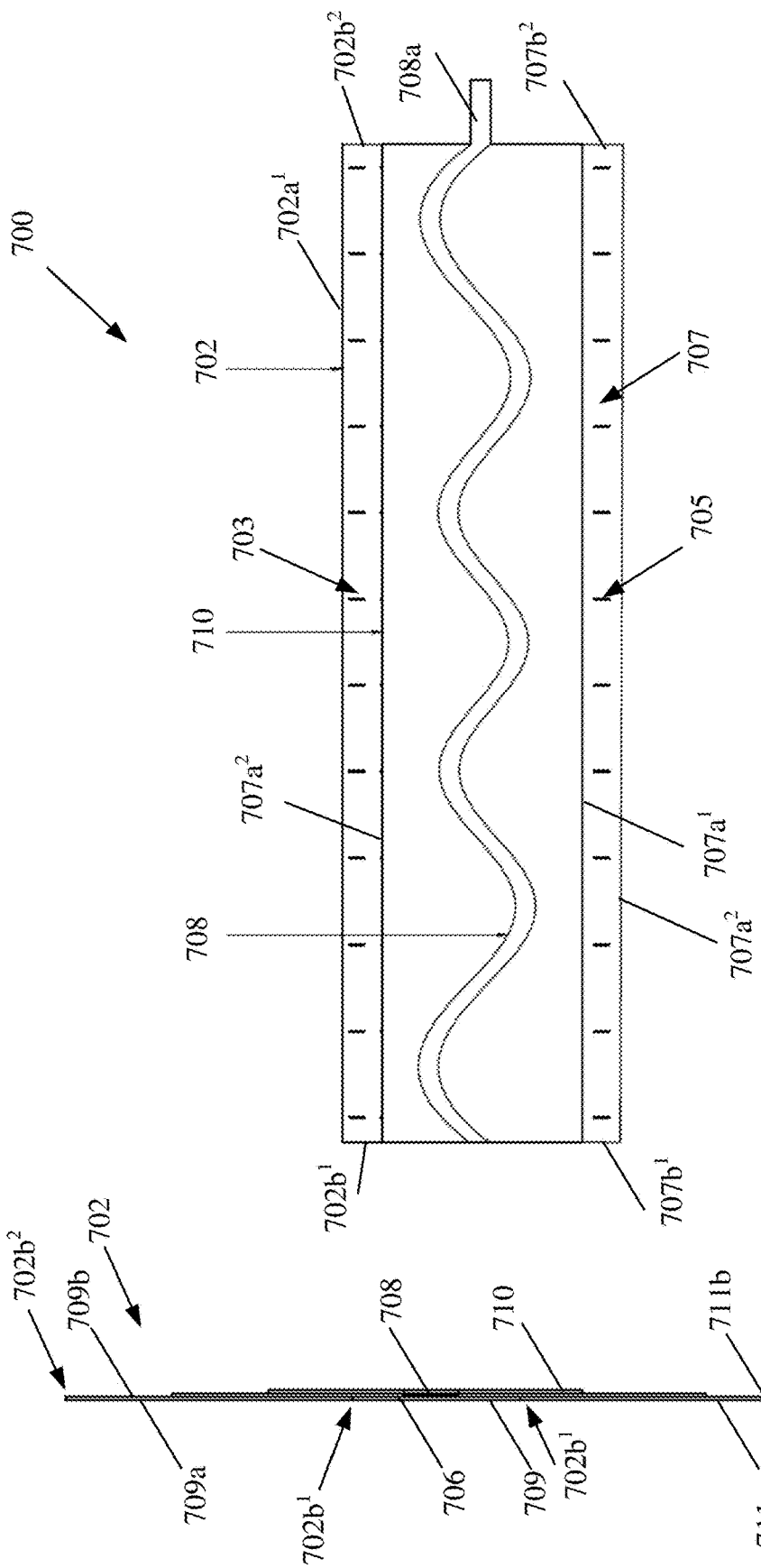

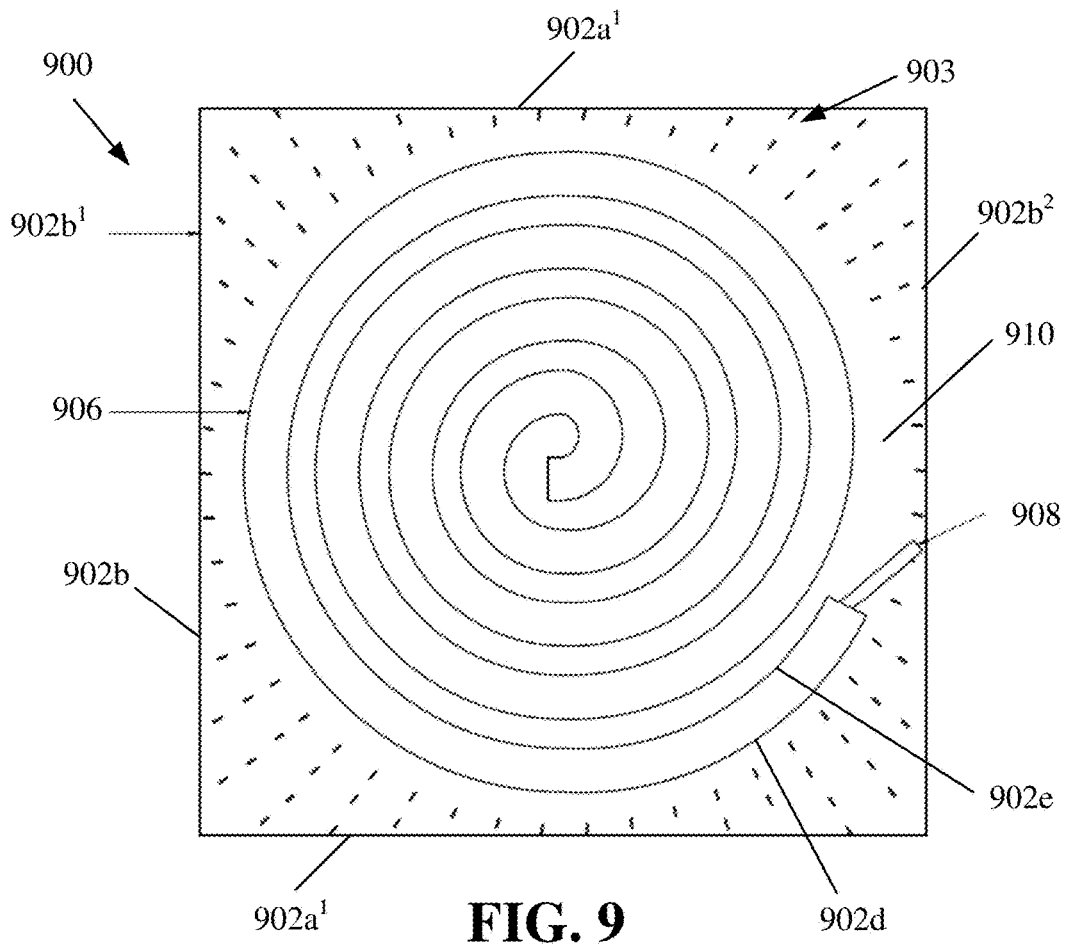
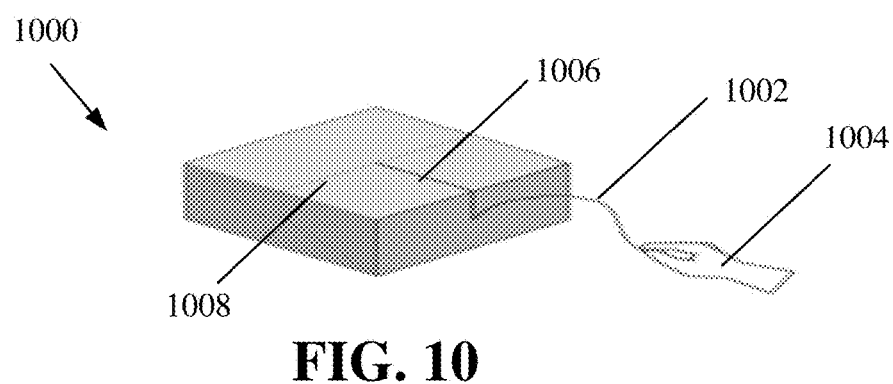

WRAPPING TEARING DEVICE

CLAIM OF PRIORITY

The present Application for Patent claims priority to U.S. Provisional Application No. 62/383,591 entitled "Wrapping Tearing Device", filed Sep. 5, 2016, which is hereby expressly incorporated by reference.

FIELD

This present disclosure relates to a wrapping tearing device and more specifically to device which allows a package to be easily unwrapped and in a precise manner such that a straight line or personalized pattern will be torn in the wrapping paper when opened.

BACKGROUND

Wrapping paper, such as gift wrapping, on a package is generally removed by using a hand to find or create a seam in the paper allowing for the paper to tear. This results in the wrapping paper always being torn and removed in a random pattern. Alternative methods for unwrapping a package, such as a gift, can include using an affixed ribbon on the package, but this also results in the wrapping paper being torn with randomness and imprecision.

Furthermore, the gift wrapping can be difficult to open for some young children, older adults and those with disabilities causing anxiousness and frustration during the gift giving occasion.

In view of the above, what is needed is a device that can be used to unwrap a package in a precise manner such that a straight line or personalized patter will be torn in the wrapping paper and at the same time will allow the wrapping paper to be easily removed from the package when unwrapping the paper.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one feature, a wrapping tearing device is provided. The device comprises a first adhesive elongated strip layer and a second adhesive elongated strip layer separated from the first adhesive layer by a gap. The first adhesive elongated strip layer comprises a first horizontal elongated edge having a first end and an opposing second end; a second horizontal elongated edge parallel to and equidistant from the first horizontal elongate edge and having a first end and an opposing second end; a first vertical side edge extending between the first end of the first horizontal elongated edge and a first end of the second horizontal elongated edge; and a second vertical side edge extending between second end of the first horizontal elongated edge and the second end of the second horizontal elongated edge forming the first elongated strip layer.

The second adhesive elongated strip layer comprises a first horizontal elongated edge, of the second adhesive elongated strip layer, having a first end and an opposing second end; a second horizontal elongated edge, of the second adhesive elongated strip layer, parallel to and equidistant from the first horizontal elongated edge, of the second adhesive elongated strip layer, and having a first end and an opposing second end; a first vertical side edge, of the second adhesive elongated strip layer, extending between the first end of the first horizontal elongated edge and the first end of the second horizontal elongated edge; and a second vertical edge, of the second adhesive elongated strip layer, extending between the second end of the first horizontal elongated edge and the second end of the second horizontal elongated edge The wrapping tearing device further comprises a first non-adhesive strip layer placed over the gap and extending over the second horizontal elongated edge of the first adhesive elongated strip layer and the third elongated edge of the second adhesive elongated strip layer; a tearing thread located on the first non-adhesive strip layer; and a second non-adhesive strip layer located on top of the tearing thread and the first non-adhesive strip layer.

According to one aspect, the tearing thread has a straight line configuration. According to another aspect, the tearing thread has a wavy line configuration. According to yet another aspect, the tearing thread has a spiral configuration.

According to yet another aspect, the device further comprises a first series of vertical perforations extending between the first horizontal elongated edge and the second horizontal elongated edge of the first adhesive horizontal strip layer; and a second series of vertical perforations extending between the first horizontal elongated edge and the second horizontal elongated edge of the second adhesive horizontal strip layer.

According to yet another aspect, the device further comprises a pull tab device secured to the tearing thread, the pull tab device, comprising an elongated member having a first portion integrally connected to a second portion, where the first portion is an under paper attachment and the second portion is a pull tab.

According to yet another aspect, the first portion of the elongated member of the pull tab device is secured to the tearing thread; the second portion of the elongated member is a pull tab; and wherein pulling on the pull tab causes the tearing thread to tear the paper along the first and second vertical perforation.

According to another feature, a wrapping tearing device is provided. The wrapping tearing device comprises a first adhesive elongated strip layer comprising: a first horizontal elongated edge having a first end and an opposing second end; a second horizontal elongated edge parallel to and equidistant from the first horizontal elongate edge and having a first end and an opposing second end; a first vertical side edge extending between the first end of the first horizontal elongated edge and a first end of the second horizontal elongated edge; and a second vertical side edge extending between second end of the first horizontal elongated edge and the second end of the second horizontal elongated edge forming the first elongated strip layer. The wrapping tearing device further includes a second adhesive elongated strip layer separated from the first adhesive layer by a gap, the second adhesive layer elongated strip comprising: a first horizontal elongated edge, of the second adhesive elongated strip layer, having a first end and an opposing second end; a second horizontal elongated edge, of the second adhesive elongated strip layer, parallel to and equidistant from the first horizontal elongated edge, of the second adhesive elongated strip layer, and having a first end and an opposing second end; a first vertical side edge, of the second adhesive elongated strip layer, extending between the first end of the first horizontal elongated edge and the first end of the second horizontal elongated edge; and a second vertical edge, of the second adhesive elongated strip layer, extending between the second end of the first horizontal elongated edge and the second end of the second horizontal elongated edge.

Further included in the wrapping tearing device is a first non-adhesive strip layer placed over the gap and extending over the second horizontal elongated edge of the first adhesive elongated strip layer and the first horizontal elongated edge of the second adhesive elongated strip layer; a tearing thread located on the first non-adhesive strip layer; a second non-adhesive strip layer located on top of the tearing thread and the first non-adhesive strip layer; a first series of vertical perforations extending between the first horizontal elongated edge and the second horizontal elongated edge of the first adhesive horizontal strip layer; and a second series of vertical perforations extending between the first horizontal elongated edge and the second horizontal elongated edge of the second adhesive horizontal strip layer.

Further included in the wrapping tearing device is a pull tab device secured to the tearing thread, the pull tab device, comprising: an elongated member having a first portion integrally connected to a second portion, where the first portion is an under paper attachment and the second portion is a pull tab. The first portion of the elongated member of the pull tab device is secured to the tearing thread and the second portion of the elongated member is a pull tab; and wherein pulling on the pull tab causes the tearing thread to tear the paper along the first and second vertical perforation.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

FIG. 4 is a top plan view of a wrapping tearing device according to yet another aspect of the present disclosure.

FIG. 5 is a side elevation view of a wrapping tearing device.

FIG. 6 is a close up view of Detail A of FIG. 5.

FIG. 7 is a top plan view of a wrapping tearing device according to yet another aspect of the present disclosure.

FIG. 8 is a side elevation view of a wrapping tearing device.

FIG. 9 is a top plan view of a wrapping tearing device according to yet another aspect of the present disclosure.

FIG. 10 illustrates a top side perspective view of a package being opened by pulling on a tearing thread.

DETAILED DESCRIPTION

Figure 1:
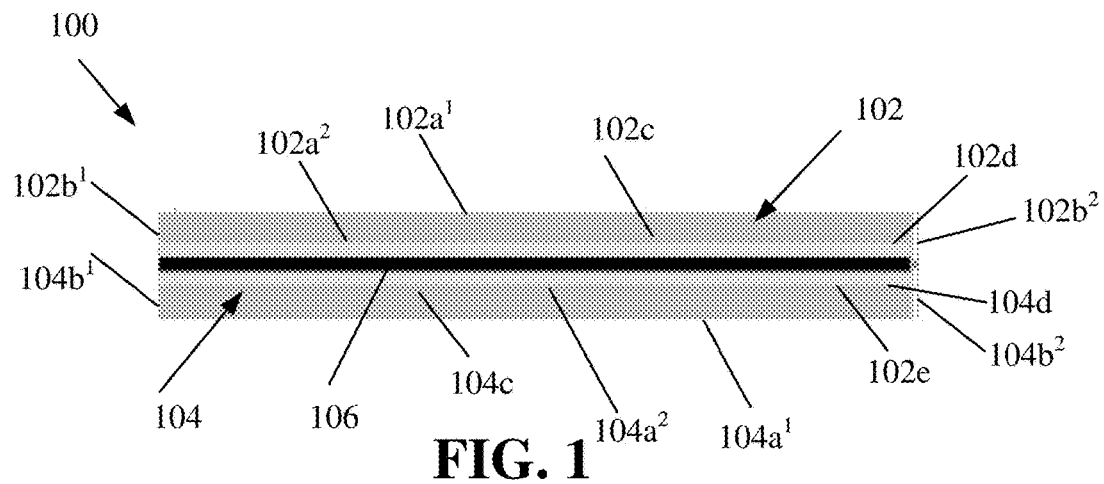
FIG. 1 is a top plan view of a wrapping tearing device according to an aspect of the present disclosure.

The present disclosure will now be described in detail with reference to the accompanying drawings. In the following description, numerous specific details are set forth in order to provide a thorough understanding of the aspects described herein. It will be apparent, however, to one skilled in the art, that these and other aspects may be practiced without some or all of these specific details. In other instances, well known process steps and/or structures have not been described in detail in order to not unnecessarily obscure the description.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation.

The term "package" may refer to, but is not limited to, a parcel, container, receptacle, vessel, can, holder box, envelope, or any other type of object that is capable of being wrapped in paper. The term "paper" may refer to wrapping paper, newspaper, tissue paper, cardboard, or any other type of material that can be easily torn apart. The terms "perforated" and "perforated member" may refer to a row of small holes or slits in paper so that a part of the paper may torn off easily. The terms "thread", "elongated tearing thread" and "tearing thread" may refer to a cord, wire, string, yarn, fiber strand, filament, floss or any other type of elongated object that can be pulled to break or tear through paper. The thread may be straight or may form a pattern. The term "pattern" may refer to the external form or appearance characteristic formed by the tearing thread when used to unwrap a package. The external form or appearance characteristic include, but is not limited to, a straight line, a wavy line, a curved line, a spiral, a helix or any other type of personalized shape or appearance designed by any individual, individuals or machines implementing the wrapping tearing device when covering or wrapping a package.

The term "adhesive" may refer to any type of substance used for sticking objects or materials together and may be classified in a variety of ways depending on their chemistries (e.g. epoxies, polyurethanes, polyimides), their form (e.g. paste, liquid, film, pellets, tape), their type (e.g. hot melt, reactive hot melt, thermosetting, pressure sensitive, contact, etc.), or their load carrying capability (structural, semi-structural, or non-structural). The adhesive of the present disclosure may be low tack enough to reposition on an object (e.g., gift) or material (e.g. wrapping paper) of the adhesive may be high tack and non-repositionable.

While the apparatus of present disclosure is described primarily with respect to a device for tearing, ripping or removing wrapping paper from a gift, the device of the present disclosure may be applied and adapted to various other types of packages that are covered or wrapped in a material that can be easily torn from the package. Also, a variety of other embodiments are contemplated having different combinations of the below described features of the device of the present disclosure, having features other than those described herein, or even lacking one or more of those features. As such, it is understood that the device can be carried out in various other suitable modes.

Straight Tear—First Example

FIG. 1 is a top plan view of wrapping tearing device 100 according to one aspect of the present disclosure. As shown, the device 100 may comprise a first adhesive elongated strip layer 102 having a first horizontal elongated edge $102a^1$ and a second horizontal elongated edge $102a^2$, the first horizontal elongated edge $102a^1$ and the second horizontal elongated edge $102a^2$ integrally connected by a first vertical elongated edge $102b^1$ and a second vertical elongated edge $102b^2$ forming a generally rectangular shape.

The first adhesive elongated strip layer 102 further includes a bottom surface (not shown) and an upper surface 102c. The upper surface 102c may include an adhesive and have a first row of perforated members 102d that extend between the first vertical elongated edge $102b^1$ and the second vertical elongated edge $102b^2$.

The first row of perforated members 102d may have a straight line configuration which allows a straight line tear or a series of tears to be made in the wrapping paper to which the device is applied. This allows the user to easily open the package or gift after the tear has been made. As described below with reference to FIG. 4, vertical perforations may be included in the device which will make the wrapping paper easier to tear off.

The device 100 may further comprises a second adhesive elongated strip layer 104 having a first horizontal elongated edge $104a^1$ and a second horizontal elongated edge $104a^2$, the first horizontal elongated edge $104a^1$ and the second horizontal elongated edge $104a^2$ may be integrally connected by a first vertical elongated edge $104b^1$ and a second vertical elongated edge $104b^2$ forming a generally rectangular shape.

The second adhesive elongated strip layer 104 further includes a bottom surface (not shown) and an upper surface 104c. The upper surface 104c may include an adhesive and have a second row of perforated members 104d that extend between the first vertical elongated edge $104b^1$ and the second vertical elongated edge $104b^2$.

According to another aspect, the second elongated strip layer 104 may be made of a non-adhesive material. Attaching the second elongated strip layer 104 to perforations or perforation members on the first elongated strip layer is by way of example only and the second elongated strip layer 104 may be detachably secured to the first elongated strip layer 102 by any known manner in the art.

An elongated tearing thread 106 may be integrally secured to the second elongated strip layer 104 and utilized to detach the second elongated strip layer 104 from the first elongated strip layer 102 by pulling upward on the elongated tearing thread 106. In an alternative embodiment, second elongated strip layer 104 may comprise a first section and a second section located on top of the first section and where the elongated tearing thread 106 is located between the first section and the second section. In yet another alternative embodiment, the elongated thread 106 may be fixedly attached to the second elongated strip layer 104 by an adhesive material or any other known method in the art. Optionally, a pull tab (See FIG. 11) may be affixed to the elongated tearing thread 106 and be utilized to pull up on the tearing thread.

The device 100 may come in a roll similar to tape. When wrapping a package the user may cut a desired length of strip and secure the strip to the package. The strip or device 100 may then be placed under the wrapping paper with an end of the elongated tearing thread 106 visible and/or the second elongated strip layer 104 visible from underneath the wrapping paper. The elongated tearing thread 106 and/or the second elongated strip layer 104 may then be pulled upwardly by a user causing the wrapping paper to tear along the first elongated strip layer 102 and the second elongated strip layer 104 causing a straight tear in the wrapping paper.

Once the tear has been completed, the remaining wrapping paper can be removed by grasping the wrapping paper along the path of the tear utilizing the first and second row of perforated members 102d, 102e along the first elongated strip layer 102.

Patterned Tear—First Example

Figure 2:
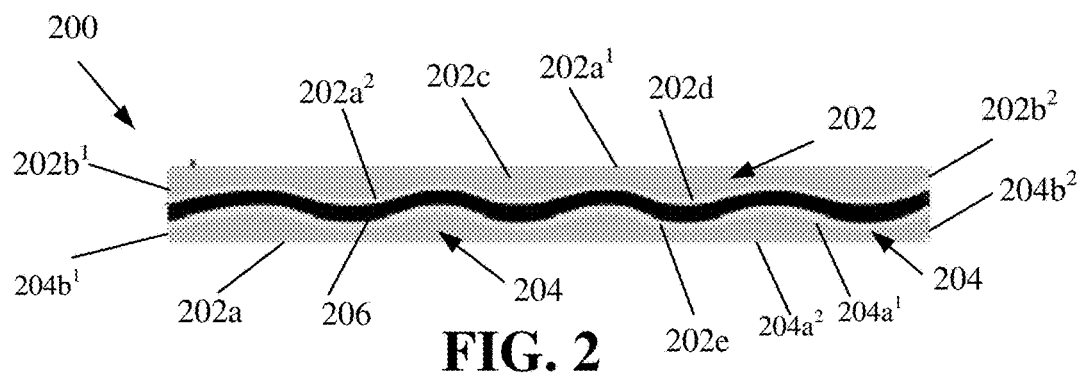
FIG. 2 is a top plan view of a wrapping tearing device according to another aspect of the present disclosure.

FIG. 2 is a top plan view of a wrapping tearing device 200 according to another aspect of the present disclosure. As shown, the device may comprise a first adhesive elongated strip layer 202 having a first horizontal elongated edge $202a^1$ and a second horizontal elongated edge $202a^2$ having a wavy configuration in this example, the first horizontal elongated edge $202a^1$ and the second horizontal elongated edge $202a^2$ integrally connected by a first vertical elongated edge $202b^1$ and a second vertical elongated edge $202b^2$ forming a generally rectangular shape.

The first adhesive elongated strip layer 202 further includes a bottom surface (not shown) and an upper surface 202c. The upper surface 202c may include an adhesive and have a first row of perforated members 202d that extend between the first vertical elongated edge $202b^1$ and the second vertical elongated edge $202b^2$.

The first row of perforated members 202d may have a wavy or curvy line configuration which allows a tear in the paper to be in a wavy or curved line in the wrapping paper to which the device is applied. This allows the user to easily open the package or gift after the tear has been made. As described below with reference to FIG. 4, vertical perforations may be included in the device which will make the wrapping paper easier to tear off.

The device 200 may further comprises a second adhesive elongated strip layer 204 having a first horizontal elongated edge $204a^1$ and a second horizontal elongated edge $204a^2$, the first horizontal elongated edge $204a^1$ and the second horizontal elongated edge $204a^2$ may be integrally connected by a first vertical elongated edge $204b^1$ and a second vertical elongated edge $204b^2$ forming a generally rectangular shape.

The second adhesive elongated strip layer 204 further includes a bottom surface (not shown) and an upper surface 204c. The upper surface 204c may include an adhesive and have a second row of perforated members 204d that extend between the first vertical elongated edge $204b^1$ and the second vertical elongated edge $204b^2$.

According to another aspect, the second elongated strip layer 204 may be made of a non-adhesive material. Attaching the second elongated strip layer 204 to perforations or perforation members on the first elongated strip layer is by way of example only and the second elongated strip layer 204 may be detachably secured to the first elongated strip layer 202 by any known manner in the art.

An elongated tearing thread 206 may be integrally secured to the second elongated strip layer 204 and utilized to detach the second elongated strip layer 204 from the first elongated strip layer 202 by pulling upward and/or sideways on the elongated tearing thread 206. In an alternative embodiment, second elongated strip layer 204 may comprise a first section and a second section located on top of the first section and where the elongated tearing thread 206 is located between the first section and the second section. In yet another alternative embodiment, the elongated thread 206 may be fixedly attached to the second elongated strip layer 204 by an adhesive material or any other known method in the art. Optionally, a pull tab (See FIG. 11) may be affixed to the elongated tearing thread 206 and be utilized to pull up on the tearing thread.

The device 200 may come in a roll similar to tape. When wrapping a package the user may cut a desired length of strip and secure the strip to the package. The strip or device 200 may then be placed under the wrapping paper with an end of the elongated tearing thread 206 visible and/or the second elongated strip layer 204 visible from underneath the wrapping paper. The elongated tearing thread 206 and/or the second elongated strip layer 204 may then be pulled upwardly by a user causing the wrapping paper to tear along the first elongated strip layer 202 and the second elongated strip layer 204 causing a wavy or curvy tear in the wrapping paper. Once the tear has been completed, the remaining wrapping paper can be removed by grasping the wrapping paper along the path of the tear utilizing the first and second row of perforated members 202d, 204d along the first elongated strip layer 202.

Patterned Tear—Second Example

Figure 3:
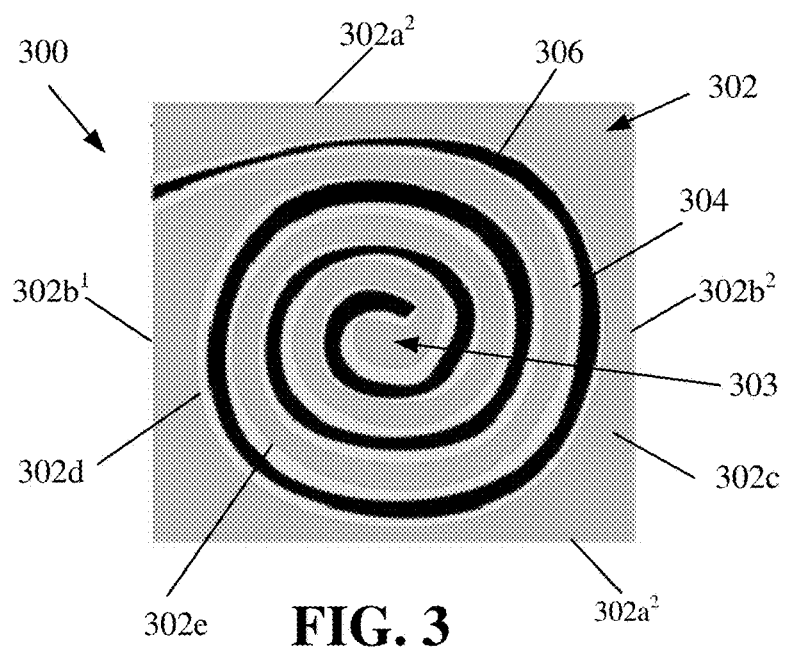
FIG. 3 is a top plan view of a wrapping tearing device according to yet another aspect of the present disclosure.

FIG. 3 is a top plan view wrapping tearing device 300 according to another aspect of the present disclosure. As shown, the device may comprise a first adhesive layer 302 having a first horizontal elongated edge $302a^1$ and a second horizontal elongated edge $302a^2$, the first horizontal elongated edge $302a^1$ and the second horizontal elongated edge $302a^2$ integrally connected by a first vertical elongated edge $302b^1$ and a second vertical elongated edge $302b^2$ forming a generally square configuration. This is by way of example only and any other polygonal shape may be utilized.

The first layer 302 further includes a bottom surface (not shown) and an upper surface 302c. The upper surface 302c may include an adhesive and have a first row of perforated members 302d and a second row of perforated members 302e parallel to the first row of perforated members 302d, both the first and second perforated members 302d, 302e may extend inwardly from a vertical elongated edge $302b^1$ or $302b^2$ of the first layer 302 to a center 303 of the first layer 302 in a circular or spiral configuration.

Each of the first and second rows of perforated members 302d, 302e may form a circular or spiral pattern which allows a tear or a series of tears to be made in the wrapping paper to which the device is applied. The shape of the rows of perforated members 302d, 302e in a circular or spiral pattern is by way of example only and any type of pattern may be utilized.

A second strip layer 304 may be detachably secured to the first and second row of perforated members 302d, 302e allowing the second strip layer 304 to be easily torn away from the first layer 302. The second strip layer 304 may be made of a non-adhesive material and conform to the shapes and/or patterns of the first and second rows of perforated members 302d, 302e. Attaching the second layer 304 to perforations on the first layer 302 is by way of example only and the second layer 304 may be detachably secured to the row of perforations on the first layer 302 by any known manner in the art.

An elongated tearing thread 306, formed in the configuration of the first and second rows of the perforated members 302d, 302e may be integrally and detachably secured to the second layer 304 and utilized to detach the second layer 304 from the first layer 302 by pulling upward or outward, for example on the elongated thread 306. In an alternative embodiment, the second layer 304 may comprise a first section and a second section located on top of the first section and where the elongated tearing thread 306 is located between the first section and the second section. In yet another alternative embodiment, the elongated tearing thread 306 may be fixedly attached to the second strip layer 304 using an adhesive material or any other known method in the art.

Straight Tear—Second Example

FIG. 4 is a top plan view of a wrapping tearing device 400 according to another aspect of the present disclosure. As shown, the device 400 may comprise a first adhesive horizontal elongated strip layer 402 having a first horizontal elongated edge $402a^1$ (See FIG. 5) and an opposing second horizontal elongated edge $402a^2$ integrally connected to a first vertical side edge $402b^1$ and a second vertical side edge $402b^2$. The first adhesive elongated strip layer 402 further includes a bottom surface 409a (See FIGS. 5-6) and an upper surface 409b. The upper surface 409b may include an adhesive and have a first series of vertical perforations 403 extending between the upper and lower edges of the first adhesive strip layer 402.

The device may further comprise a second horizontal adhesive elongated strip layer 407 having a first elongated edge $407a^1$ (See FIG. 5) and an opposing second elongated edge $407a^2$ integrally connected to a first vertical side edge $407b^1$ and a second vertical side edge $407b^2$. The second horizontal adhesive elongated strip layer 407 further includes a bottom surface 411a (See FIGS. 5-6) and an upper surface 411b. The upper surface 411b may include an adhesive and have a second series of vertical perforations 405 extending between the upper and lower edges of the second horizontal adhesive elongated strip layer 407.

As shown in FIG. 5, the first and second horizontal adhesive elongated strip layers 402 and 407 may be located in the same horizontal plane and separated by a gap 415. A first non-adhesive strip 406 may be placed over the gap 415 and extending over the first elongated edge $402a^2$ of the first horizontal adhesive elongated strip layer 402 and the second horizontal elongated edge $407a^2$ of the second horizontal adhesive elongated strip layer 407. A tearing thread 408 may then be placed over the first non-adhesive layer 406 and secured by adhesive or any other type of securing means known in the art. A second non-adhesive layer 410 may then be placed on top of the first non-adhesive layer 406 and the tearing thread 408. The second non-adhesive layer 410 may have a width larger than the width of the first non-adhesive layer 406 so that outer edges of the second non-adhesive layer 410 are placed on top of the first and second horizontal elongated adhesive layers 402, 407 and secured in place. In one embodiment, the first non-adhesive layer 406, the tearing thread 408 and the second non-adhesive layer 410 may be integrally formed into a single layer.

According to one embodiment, the vertical perforations in the first series of vertical perforations 403 may be parallel and equidistant apart. Similarly, the vertical perforations in the second series of vertical perforations 405 may be parallel and equidistant apart. Each of the perforations in the series of perforations 403, 405 may have a straight line configuration which allows a straight line tear or a series of tears to be made in the wrapping paper (not shown) to which the device is applied. This allows the user to easily open the gift after the tear has been made. By utilizing vertical perforations in the adhesive elongated strip layer 402, the wrapping paper (not shown) is easier to tear open.

The wrapping tearing device 400 may come in a roll similar to tape or may be pre-portioned in a variety of shapes and sizes. When wrapping a package the user may cut a desired length of strip and secure the strip to the package by any means known in the art. FIG. 6 is a close up view of Detail A of FIG. 5. The strip or device 400 may then be placed under the wrapping paper with an end of the tearing thread 408 visible from underneath the wrapping paper. The tearing thread 408 may then be pulled upwardly or sideways, for example, by a user causing the wrapping paper to tear along the tearing thread 408 causing a straight tear in the wrapping paper. Once the tear has been completed, the remaining wrapping paper can be removed by grasping the wrapping paper and pulling it off the package.

Patterned Tear—Third Example

FIG. 7 is a top plan view of a wrapping tearing device 700 according to yet another aspect of the present disclosure. As shown, the wrapping tearing device 700 may comprise a first horizontal adhesive elongated strip layer 702 having a first horizontal elongated edge $702a^1$ and an opposing second horizontal elongated edge $702a^2$ integrally connected to a first vertical side edge $702b^1$ and a second vertical side edge $702b^2$. The first adhesive horizontal elongated strip layer 702 further includes a bottom surface 709a (See FIG. 8) and an upper surface 709b. The upper surface 709b may include an adhesive and have a first series of vertical perforations 703 extending between the upper and lower edges of the first adhesive horizontal elongated strip layer 702.

The device may further comprise a second adhesive horizontal elongated strip layer 707 having a first horizontal elongated edge $707a^1$ and an opposing second elongated horizontal edge $707a^2$ integrally connected to a first vertical side edge $707b^1$ and a second vertical side edge $707b^2$. The second adhesive horizontal elongated strip layer 707 further includes a bottom surface 711a (See FIG. 8) and an upper surface 711b. The upper surface 711b may include an adhesive and have a second series of vertical perforations 705 extending between the upper and lower horizontal elongated edges of the second adhesive strip layer 707.

As shown in FIG. 8, the first and second adhesive horizontal elongated strip layers 702 and 707 may be located parallel to each other and separated by a gap. A first non-adhesive strip 706 placed over the gap and extending over the second horizontal elongated layer $702a^2$ of the first horizontal adhesive elongated strip layer 702 and the second horizontal elongated layer $707a^2$ of the second adhesive horizontal elongated strip layer 707. A tearing thread 708 may then be placed over the first non-adhesive layer 706 and secured by adhesive or any other type of securing means known in the art. A second non-adhesive layer 710 may then be placed on top of the first non-adhesive layer 706 and the tearing thread 708. The second non-adhesive layer 710 may have a width larger than the width of the first non-adhesive layer 706 so that the outer edges of the second non-adhesive layer 710 may be placed on top of the second horizontal elongated layer $702a^2$ of the first horizontal adhesive elongated strip layer 702 and the first horizontal elongated layer $707a^2$ of the second adhesive horizontal elongated strip layer 707. In one embodiment, the first non-adhesive layer 706, the tearing thread 708 and the second non-adhesive layer 710 may be integrally formed into a single layer.

According to one embodiment, the vertical perforations in the first series of vertical perforations 703 may be parallel and equidistant apart. Similarly, the vertical perforations in the second series of vertical perforations 705 may be parallel and equidistant apart. Each of the perforations in the series of perforations 703, 705 may have a straight line configuration which allows a straight line tear or a series of tears to be made in the wrapping paper (not shown) to which the device is applied. This allows the user to easily open the wrapping paper after the tear has been made. By utilizing vertical perforations in the first and/or adhesive elongated strip layers 702, 707 the wrapping paper (not shown) is easier to tear open.

As shown in FIG. 7, the tearing thread 708, located underneath the second non-adhesive strip 710, may be formed in a pattern such as wavy lines as shown. However, any other pattern may be utilized. Forming the tearing thread 708 into a pattern, as opposed to a straight horizontal line as shown in FIG. 4, allows a tear or a series of tears to be made in the wrapping paper in the shape of the pattern to which the wrapping tearing device 700 is applied.

The wrapping tearing device 700 may come in a roll similar to tape. When wrapping a package the user may cut a desired length of strip and secured the strip to the package. The strip or device 700 may then be placed under the wrapping paper with an end of the tear thread 708a visible from underneath the wrapping paper. The tearing thread 708 may then be pulled upwardly or outwardly by a user causing the wrapping paper to tear along the tearing thread 708 causing a tear in the wrapping paper. Once the tear has been completed, the remaining wrapping paper can be removed by grasping the wrapping paper and pulling it off the package. The tear in the wrapping paper may be in the pattern of the tearing thread 708. If the tearing thread 708 has a wavy configuration, the torn paper may have a wavy configuration. Alternatively, if the tearing thread 708 has a straight configuration, the torn paper may have a straight configuration.

Patterned Tear—Fourth Example

FIG. 9 is a top plan view of a wrapping tearing device 900 according to yet another aspect of the present disclosure. As shown, the wrapping tearing device 900 comprises a first adhesive layer 902 having a first horizontal elongated edge $902a^1$ and a second horizontal elongated edge $902a^2$, the first horizontal elongated edge $902a^1$ and the second horizontal elongated edge $902a^2$ may be integrally connected by a first vertical elongated edge $902b^1$ and a second vertical elongated edge $902b^2$ forming a generally square configuration. This is by way of example only and any other polygonal shape may be utilized.

The adhesive layer 902 further includes a bottom surface (not shown) and an upper surface 910. The upper surface 910 may include a series of perforations 903 located between the first horizontal elongated edge $902a^1$ and the second horizontal elongated edge $902a^2$ and the first vertical elongated edge $902b^1$ and the second vertical elongated edge $902b^2$. A first line of perforations 902d may extending in a circular or spiral configuration and a second line of perforations 902e may be parallel to the first line of perforations 902d where the first and second line of perforations 902d, 902e form a non-adhesive tear away strip 906. Both the first and second lines of perforations 902d, 902e may extend inwardly from a side of the adhesive layer 902 to a center of the adhesive layer 902 forming a spiral pattern. Located underneath the non-adhesive tear away strip 906 is a tearing thread 908 which separates the wrapping paper. The spiral pattern of the non-adhesive tear away strip 906 allows a tear or a series of tears to be made in the wrapping paper to which the wrapping tearing device 900 is applied.

The tearing thread 908 may be integrally secured to the non-adhesive tear away strip 906 and utilized to detach the non-adhesive tear away strip 906 from the adhesive layer 902 by pulling upward, sideways or outward on the tearing thread 908. In an alternative embodiment, the non-adhesive tear away strip 906 may comprise a first section and a second section located on top of the first section and where the tearing thread 908 is located between the first section and the second section. In yet another alternative embodiment, the tearing thread 908 may be fixedly attached to the non-adhesive tear away strip 906 using an adhesive material or any other known method in the art. Additionally, the series of perforations 903 located between the first horizontal elongated edge 902$a^1$ and the second horizontal elongated edge 902$a^2$ and the first vertical elongated edge 902$b^1$ and the second vertical elongated edge 902$b^2$ in a generally circular configuration further aides an individual unwrapping the package.

Tearing Thread

FIG. 10 illustrates a top side perspective view of a package 1000 being opened by pulling on a tearing thread 1002. As shown, a user may use his or her hand 1004 to pull upwardly and outwardly creating a straight line 1006 in the paper 1008 covering the package 100.

Pull Tab

Figure 11:
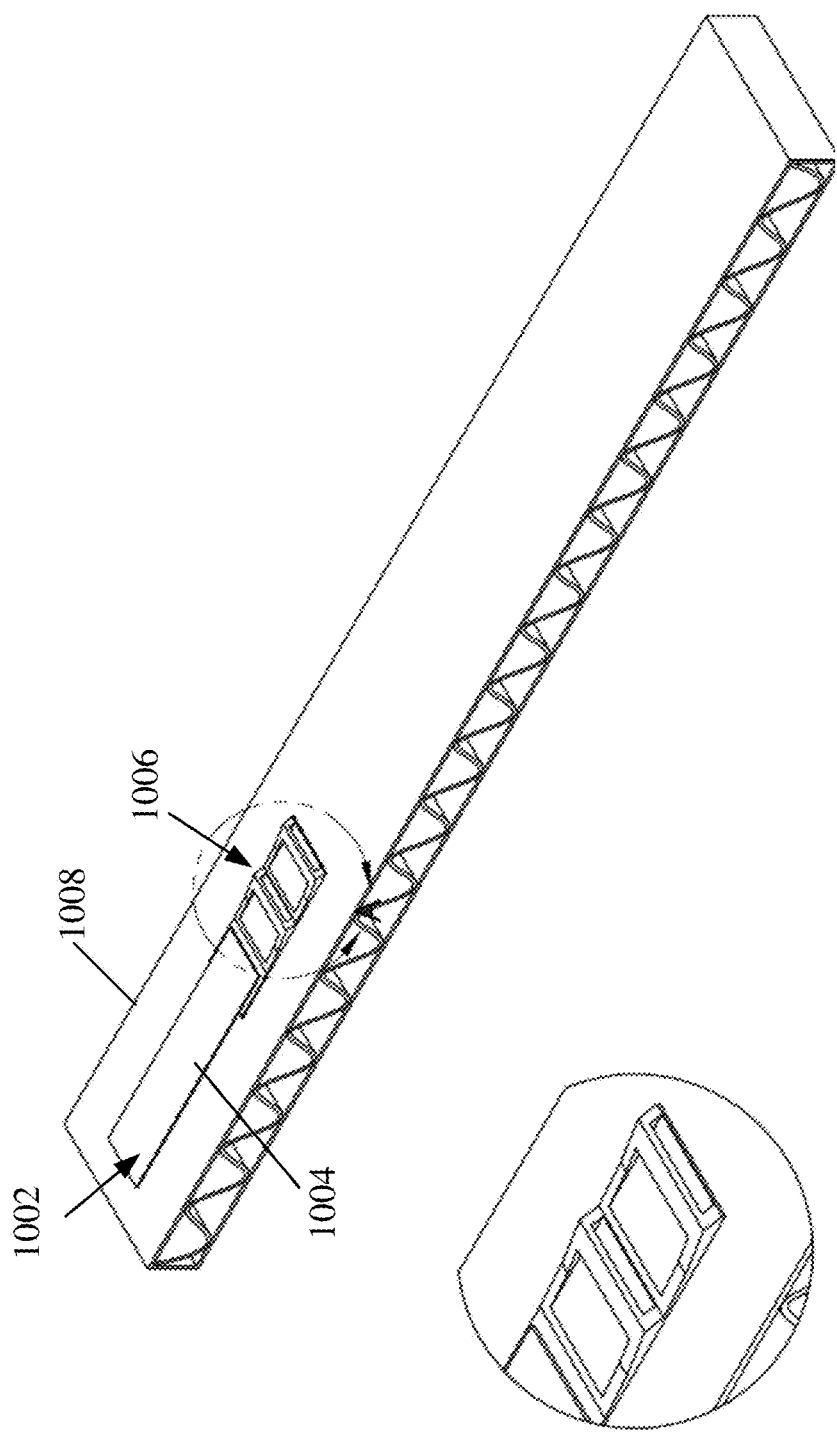
FIG. 11 is top perspective view of a pull tab device attached to a gift box according to one aspect.

FIG. 11 is top perspective view of a pull tab device 1102 attached to a gift box 1104 according to one aspect. The wrapping tearing device 1100 of FIG. 11 may be constructed similarly to any of the wrapping tearing devices described herein. The pull tab device 1102 may include an under paper attachment 1104 with a pull tab 1106 at one end of the under paper attachment 1104 for attaching to a gift box 1108. When wrapping the gift box 1108 with wrapping paper, the pull tab device 1102 may be secured to and covering the tearing device (described above) allowing a user to hide the tearing thread. Additionally, the user may opt to have a gift/name tag attached to the tearing thread. To unwrap the package, the user pulls on the pull tab device 1102.

Method of Making

To form the wrapping tearing device described above, a user may serrate, perforate or cut the first elongated strip layer (or first layer) so that is creates a straight line or pattern. Next, the adhesive along the path of the desired tear may be removed and perforations added perpendicular to the first layer forming a patterned tear line. The first strip may be an adhesive strip and act as support for wrapping paper along the tear line. Without the adhesive strip, the tear cannot be made in a precise manner Next, a second elongated strip layer (or second layer) having a thread extending along the patterned configuration for the design tear pattern.

Method of Use

To utilize the wrapping tearing device of the present disclosure, a strip of the device may be measured against the wrapping paper for the package and then cut to fit. Once the appropriate size has been measured and cut, a non-adhesive cover on the bottom surface of the first layer may be removed and the device attached to the backside of the package wrap. The package may then be then wrapped with the strip laying between the wrap and the package with a section of the strip emitting from the wrapped paper seam.

If a pulling attachment is used, the user will feel for the pull tab receptacle at the beginning of the pattern and insert the pulling attachment through the face of the wrapping paper and into the receptacle. The receiver of the package will then pull on the attachment and the wrapping paper will separate along the path of the defined straight line or pattern. However, if no pulling attachment is used, then the user will extend the strip beyond an edge of the wrapping paper and trim away the adhesive leaving only the second elongated strip layer (i.e. non adhesive portion) of device exposed. A decorative tab or cap can be added if desired.

The receiver of the package may then pull on the second elongated layer (non- adhesive portion) that contains the thread that extends beyond the wrapping paper and begin the tear along the defined straight line or pattern. Once the wrapping paper has been torn enough for the user to grasp an opening, the user will pull perpendicular to the tear line and the perforations along the second elongated strip layer allowing the wrapping paper to tear along that direction.

Variations

The device of the present disclosure may be made from the same material that the package is wraped in.

The tearing thread, located under the paper, may be connected to a card, bow, ribbon or any other attachment known in the art which may be covered by the paper. The attachment can be a simple hook made from the 'thread' component or any other type of 'catch' which can be gripped, attached, connected through the paper.

The first strip made of an adhesive matter may be made integral to the wrapping paper as material of different tensile strength along a desired tear line.

The thread may lay between the sheets of wrapping paper along a desired tear lien between materials of differing tensile strength then the wrapping paper.

A receptacle for a pull tab may be added to the end of the thread allowing a user to more easily pull the thread.

The second elongated strip layer (or second layer) may be made of the same with the strip with perforations or serrations defining the pattern of the tear line. Adhesive may also be added to the strip bordering the tear line allowing a user to pull the second strip layer to create a pattern.

Alternatively, the thread may be adhered to the second layer along the path of the tear. The first layer may be used so that the second layer separates along the path of the thread in the desired pattern.

The various features of the disclosure described herein can be implemented in different devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A wrapping tearing device comprising:
  a first adhesive elongated strip layer, comprising:
    a first horizontal elongated edge having a first end and an opposing second end;
    a second horizontal elongated edge parallel to and equidistant from the first horizontal elongate edge and having a first end and an opposing second end;
    a first vertical side edge extending between the first end of the first horizontal elongated edge and a first end of the second horizontal elongated edge; and
    a second vertical side edge extending between second end of the first horizontal elongated edge and the second end of the second horizontal elongated edge forming the first elongated strip layer; and
  a second adhesive elongated strip layer separated from the first adhesive layer by a gap, the second adhesive layer elongated strip, comprising:
    a first horizontal elongated edge, of the second adhesive elongated strip layer, having a first end and an opposing second end;
    a second horizontal elongated edge, of the second adhesive elongated strip layer, parallel to and equidistant from the first horizontal elongated edge, of the second adhesive elongated strip layer, and having a first end and an opposing second end; and
    a first vertical side edge, of the second adhesive elongated strip layer, extending between the first end of the first horizontal elongated edge and the first end of the second horizontal elongated edge;

a second vertical edge, of the second adhesive elongated strip layer, extending between the second end of the first horizontal elongated edge and the second end of the second horizontal elongated edge; and a first non-adhesive strip layer placed over the gap and extending over the second horizontal elongated edge of the first adhesive elongated strip layer and the first horizontal elongated edge of the second adhesive elongated strip layer;

a tearing thread located on the first non-adhesive strip layer; and a second non-adhesive strip layer located on top of the tearing thread and the first non-adhesive strip layer.

2. The device of claim 1, wherein the tearing thread has a straight line configuration.

3. The device of claim 1, wherein the tearing thread has a wavy line configuration.

4. The device of claim 1, wherein the tearing thread has a spiral configuration.

5. The device of claim 1, further comprising:

a first series of vertical perforations extending between the first horizontal elongated edge and the second horizontal elongated edge of the first adhesive horizontal strip layer; and a second series of vertical perforations extending between the first horizontal elongated edge and the second horizontal elongated edge of the second adhesive horizontal strip layer.

6. The device of claim 5, further comprising a pull tab device secured to the tearing thread, the pull tab device, comprising:

an elongated member having a first portion integrally connected to a second portion, where the first portion is an under paper attachment and the second portion is a pull tab.

7. The device of claim 6, wherein the first portion of the elongated member of the pull tab device is secured to the tearing thread.

8. The device of claim 6, wherein the second portion of the elongated member is a pull tab; and wherein pulling on the pull tab causes the tearing thread to tear the paper along the first and second vertical perforation.

9. The device of claim 1, wherein the first adhesive elongated strip layer further includes a bottom surface and an opposing upper surface.

10. The device of claim 9, wherein the upper surface includes a first series of vertical perforations extending between the first end of the first horizontal elongated edge and the second end of the first horizontal elongated edge.

11. The device of claim 9, wherein the upper surface includes a second series of vertical perforations extending between the first end of the second horizontal elongated edge and the second end of the second horizontal elongated edge.

12. The device of claim 11, wherein a gap separates the first horizontal adhesive elongated strip layer from the second horizontal adhesive elongated strip layer.

13. The device of claim 12, where the first non-adhesive strip is placed over the gap and extends over the first horizontal elongated edge of the first horizontal adhesive elongated strip layer and the second vertical elongated edge and of the first horizontal adhesive elongated strip layer.

14. The device of claim 9, wherein the first horizontal adhesive elongated strip layer is located in the same horizontal plane of the second horizontal adhesive elongated strip layer.

15. The device of claim 1, wherein the second non-adhesive layer has a width larger than the width of the first non-adhesive layer so that the outer edges of the second non-adhesive layer are placed on top of the first and second horizontal elongated adhesive layers.

16. The device of claim 1, wherein the tearing thread and the second non-adhesive layer are integrally formed into a single layer.

17. A wrapping tearing device comprising:

a first adhesive elongated strip layer, comprising:

a first horizontal elongated edge having a first end and an opposing second end;

a second horizontal elongated edge parallel to and equidistant from the first horizontal elongate edge and having a first end and an opposing second end;

a first vertical side edge extending between the first end of the first horizontal elongated edge and a first end of the second horizontal elongated edge; and a second vertical side edge extending between second end of the first horizontal elongated edge and the second end of the second horizontal elongated edge forming the first elongated strip layer; and a second adhesive elongated strip layer separated from the first adhesive layer by a gap, the second adhesive layer elongated strip, comprising:

a first horizontal elongated edge, of the second adhesive elongated strip layer, having a first end and an opposing second end;

a second horizontal elongated edge, of the second adhesive elongated strip layer, parallel to and equidistant from the first horizontal elongated edge, of the second adhesive elongated strip layer, and having a first end and an opposing second end; and a first vertical side edge, of the second adhesive elongated strip layer, extending between the first end of the first horizontal elongated edge and the first end of the second horizontal elongated edge;

a second vertical edge, of the second adhesive elongated strip layer, extending between the second end of the first horizontal elongated edge and the second end of the second horizontal elongated edge; and a first non-adhesive strip layer placed over the gap and extending over the second horizontal elongated edge of the first adhesive elongated strip layer and the first horizontal elongated edge of the second adhesive elongated strip layer;

a tearing thread located on the first non-adhesive strip layer; and a second non-adhesive strip layer located on top of the tearing thread and the first non-adhesive strip layer;

a first series of vertical perforations extending between the first horizontal elongated edge and the second horizontal elongated edge of the first adhesive horizontal strip layer; and a second series of vertical perforations extending between the first horizontal elongated edge and the second horizontal elongated edge of the second adhesive horizontal strip layer.

18. The device of claim 17, further comprising a pull tab device secured to the tearing thread, the pull tab device, comprising:

an elongated member having a first portion integrally connected to a second portion, where the first portion is an under paper attachment and the second portion is a pull tab.

19. The device of claim 18, wherein the first portion of the elongated member of the pull tab device is secured to the tearing thread.

20. The device of claim 18, wherein the second portion of the elongated member is a pull tab; and wherein pulling on the pull tab causes the tearing thread to tear the paper along the first and second vertical perforation.

* * * * *